(12) United States Patent
Noda et al.

(10) Patent No.: US 7,702,842 B2
(45) Date of Patent: Apr. 20, 2010

(54) RELAY DEVICE, RELAY METHOD, AND INFORMATION RECORDING MEDIUM

(75) Inventors: Yasuyuki Noda, Tsurugashima (JP); Myrine Maekawa, Tsurugashima (JP); Masao Higuchi, Tsurugashima (JP); Ryuichiro Morioka, Tsurugashima (JP); Kunihiro Minoshima, Tsurugashima (JP); Kinya Ohno, Tsurugashima (JP)

(73) Assignee: Pioneer Corporation, Meguro-Ku, Tokyo (JP)

( * ) Notice: Subject to any disclaimer, the term of this patent is extended or adjusted under 35 U.S.C. 154(b) by 157 days.

(21) Appl. No.: 12/088,621

(22) PCT Filed: Sep. 12, 2006

(86) PCT No.: PCT/JP2006/318018

§ 371 (c)(1), (2), (4) Date: May 7, 2008

(87) PCT Pub. No.: WO2007/037117

PCT Pub. Date: Apr. 5, 2007

(65) Prior Publication Data

US 2009/0164674 A1 Jun. 25, 2009

(30) Foreign Application Priority Data

Sep. 29, 2005 (JP) .............................. 2005-284037

(51) Int. Cl.
*G06F 13/36* (2006.01)
*G06F 13/00* (2006.01)

(52) U.S. Cl. ..................... 710/315; 710/105; 709/242

(58) Field of Classification Search ......... 710/105–106, 710/305–315; 709/242
See application file for complete search history.

(56) References Cited

U.S. PATENT DOCUMENTS

| 5,835,738 | A  | * | 11/1998 | Blackledge et al. | ......... 710/307 |
| 6,957,273 | B2 | * | 10/2005 | Haneda et al. | ............... 709/240 |
| 7,043,594 | B2 | * | 5/2006  | Fukushima et al. | ......... 710/314 |
| 2003/0191884 | A1 | * | 10/2003 | Anjo et al. | ................... 710/307 |
| 2009/0216921 | A1 | * | 8/2009 | Saito et al. | ..................... 710/39 |
| 2009/0235048 | A1 | * | 9/2009 | Mitsubayashi et al. | ......... 712/29 |

FOREIGN PATENT DOCUMENTS

| JP | 10-126423 | 5/1998 |
| JP | 11-055297 | 2/1999 |
| JP | 11-187061 | 7/1999 |
| WO | 99/35856  | 7/1999 |

* cited by examiner

*Primary Examiner*—Christopher B Shin
(74) *Attorney, Agent, or Firm*—Drinker Biddle & Reath LLP

(57) ABSTRACT

A relay device and the like are provided which are capable of easily transmitting/receiving information among information processors connected on buses whose information transmission standards are different from each other.

A bridge B1 for connecting buses BS1 and BS2 whose information transmission standards are different from each other includes: an operation unit (11) for performing an operation of instructing an operation of an apparatus connected to any of the buses BS; a message generator 5 for generating a control message corresponding to the instructed operation; and a packet transmitter/receiver (7, 8) for transmitting the generated control message to a target apparatus via the bus BS to which the target apparatus is connected.

7 Claims, 8 Drawing Sheets

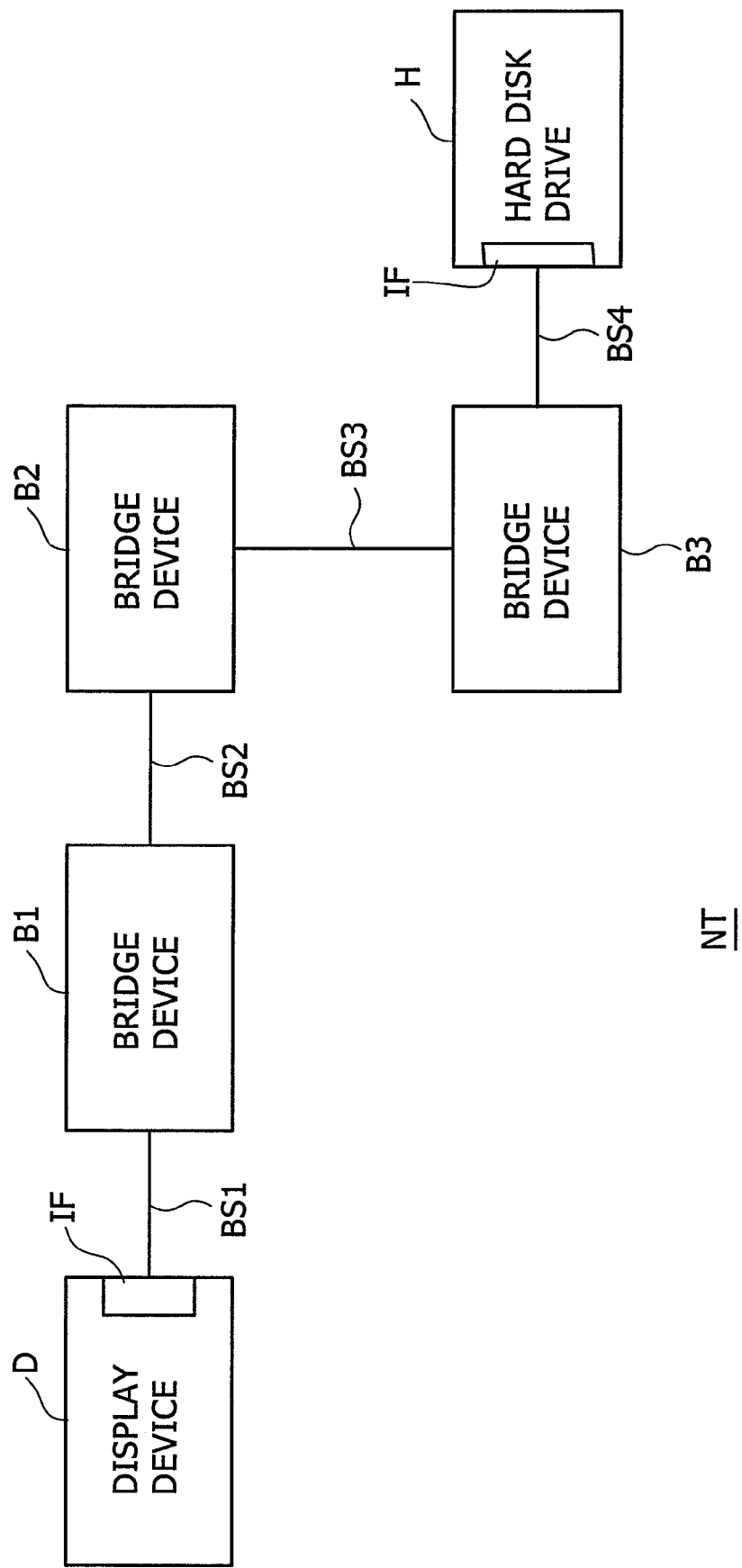

RELAY DEVICE, RELAY METHOD, AND INFORMATION RECORDING MEDIUM

TECHNICAL FIELD

The present invention belongs to the technical field of a relay device, a relay method, and an information recording medium where a relaying process program is recorded. More particularly, the invention belongs to the technical field of a relay device and a relay method for relaying information among buses whose information transmission standards are different from each other, and needing a converting process previously set at the time of transmitting the information from one of the buses to another bus, and an information recording medium where a relaying process program is recorded.

BACKGROUND ART

In recent years, a number of standards are proposed such as the USB (Universal Serial Bus) standard and the IEEE (Institute of Electrical and Electronic Engineers) 1394 standard for transmitting/receiving information such as image information among a plurality of information processors (for example, a DVD (Digital Versatile Disc) player and a liquid crystal television set) via a bus. A standard for bus connection for transmitting/receiving information by connecting buses conformed with different standards is also proposed.

One of the conventional techniques of the bus connection is described, for example, in the following patent document 1.

Patent document 1: Japanese Unexamined Patent Application Publication No. H11-55297 (claim 7 and the like)

DISCLOSURE OF THE INVENTION

Problems to be Solved by the Invention

Although a number of conventional techniques for connecting buses conformed with the same standard including the patent document 1 exist, a technique for realizing connection of buses conformed with different standards has not been proposed.

On the other hand, in view of the increasing trend of networks in recent years, demands for transmitting/receiving information among ends of buses conformed with different standards are also increasing. For example, in the case where a network is constructed using a bus conformed with the IEEE1394 standard in one room and a network is constructed using a bus conformed with a so-called IP (Internet Protocol) standard (hereinbelow, simply called the LAN (Local Area Network) standard) such as the IEEE802.3CSMA/CD (Carrier Sense Multiple Access with Collision Detection) standard in another room, when a hard disk drive in which image information is recorded is connected to the bus in the one room, and a television set is connected to the bus in the another room, a demand is expected such that an image of image information recorded on the hard disk drive is displayed on the television set in the another room.

It is, however, conventionally impossible to transmit/receive information directly between information processors connected to ends of buses conformed with different standards for the reason that the buses are conformed with different standards. Therefore, in the above example, an image of image information recorded in the hard disk drive cannot be displayed on the television set.

The present invention has been achieved in view of the problems, and an object of the invention is to provide a relay device and a relay method capable of easily transmitting/receiving information among information processors connected to buses needing a converting process previously set at the time of transmitting information from a bus to another bus, a relaying process program, and an information recording medium on which the relaying process program is recorded.

Means for Solving the Problems

In order to solve the above problem, the invention according to claim 1 relates to a relay device for connecting a plurality of buses, wherein information communication standards which a plurality of the buses are to be in conformity to are different from each other, and a plurality of the buses need a converting process previously set at the time of transmitting information from one of the buses to another bus, the relay device comprising:

a first storing device which stores first identification information indicative of the relay device itself;

an allocating device which allocates different processor identification information to each of information processors connected to the buses;

a second storing device which stores second identification information including the allocated processor identification information and indicating the information processor, for each of the buses connected;

a generating device, at the time of controlling operation of a target information processor as the information processor connected to the another bus, which generates a control message including the first identification information indicative of the relay device connected to the another bus to which the target information processor is connected, operation information indicative of the operation, and the processor identification information indicative of the target information processor; and a transmitting device which transmits the generated control message to the relay device connected to the another bus to which the target information processor is connected.

In order to solve the above problem, the invention according to claim 6 relates to a relay method executed by a relay device connecting a plurality of buses, wherein information communication standards which a plurality of the buses are to be in conformity to are different from each other, and a plurality of the buses need a converting process previously set at the time of transmitting information from one of the buses to another bus, and the relay device comprising:

a first storing device which stores first identification information indicative of the relay device itself an allocating device which allocates different processor identification information to each of information processors connected to the buses; and a second storing device which stores second identification information including the allocated processor identification information and indicating the information processor for each of the buses connected, the method comprising:

a generating process, at the time of controlling operation of a target information processor as the information processor connected to the another bus, of generating a control message including the first identification information indicative of the relay device connected to the another bus to which the target information processor is connected, operation information indicative of the operation, and the processor identification information indicative of the target information processor; and a transmitting process of transmitting the generated control message to the relay device connected to the another bus to which the target information processor is connected.

In order to solve the above problem, the invention according to claim 7 relates to an information recording medium where a relay process program is computer-readably recorded, the relay process program making a relay computer included in a relay device for connecting a plurality of buses, wherein information communication standards which a plurality of the buses are to be in conformity to are different from each other, and a plurality of the buses need a converting process previously set at the time of transmitting information from one of the buses to another bus, function as:

a first storing device which stores first identification information indicative of the relay device itself;

an allocating device which allocates different processor identification information to each of information processors connected to the buses;

a second storing device which stores second identification information including the allocated processor identification information and indicating the information processor for each of the buses connected;

a generating device, at the time of controlling operation of a target information processor as the information processor connected to the another bus, which generates a control message including the first identification information indicative of the relay device connected to the another bus to which the target information processor is connected, operation information indicative of the operation, and the processor identification information indicative of the target information processor; and a transmitting device which transmits the generated control message to the relay device connected to the another bus to which the target information processor is connected.

BRIEF DESCRIPTION OF DRAWINGS

[FIG. 1]
FIG. 1 is a block diagram showing a whole network in an embodiment.

FIGS. 2A to 2D are diagrams showing the configuration of a bridge of the embodiment.
FIG. 2A is a block diagram showing a schematic configuration of the bridge.
FIGS. 2B to 2D are diagrams illustrating routing information in the bridges.

FIGS. 3A to 3C are diagrams showing the configuration of identification information and the like in the embodiment.
FIG. 3A is a diagram showing the configuration of bridge identification information.
FIG. 3B is a diagram showing the configuration of information stored in a device information storage.
FIG. 3C is a diagram showing the configuration of a message for control.

FIG. 4 is a flowchart (I) showing operations executed in the bridge in the embodiment.

FIG. 5 is a flowchart (II) showing operations executed in the bridge in the embodiment.

FIGS. 6A and 6B are diagrams each showing the structure of a packet transmitted in conformity with the IEEE1394 standard in a network in the embodiment.
FIG. 6A is a diagram showing the configuration of a source packet.
FIG. 6B is a diagram showing the configuration of a packet including the source packet.

FIG. 7 is a diagram showing the structure of a frame transmitted in conformity with the LAN standard in a network in the embodiment.

DESCRIPTION OF REFERENCE NUMERALS

Figure 2A:
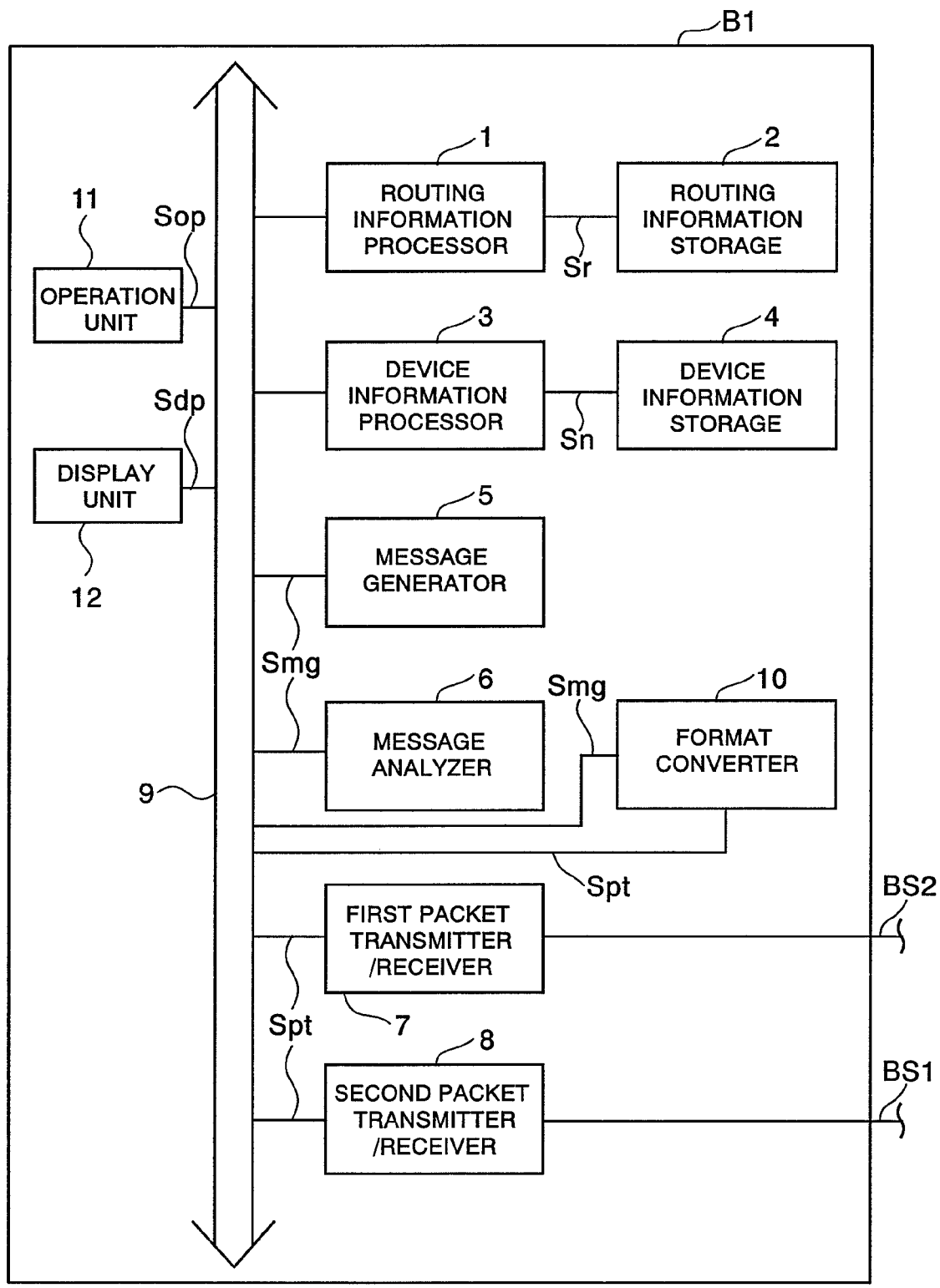
[FIGS. 2A to 2D]

| | |
|---|---|
| 1 | routing information processor |
| 2 | routing information storage |
| 3 | device information processor |
| 4 | device information storage |
| 5 | message generator |
| 6 | message analyzer |
| 7 | first packet transmitter/receiver |
| 8 | second packet transmitter/receiver |
| 9 | internal bus |
| 10 | format converter |
| 11 | operation unit |
| 12 | display unit |
| 20 | bus kind information |
| 21 | device identification information |
| 30 | bus identification information |
| 31 | processor identification information |
| 32 | bus unique identification information |
| 40 | operation information |
| D | display device |
| H | hard disk drive |
| B1, B2, B3 | bridge |
| NT | network |
| MG | control message |
| BS1, BS2, BS3, BS4 | bus |
| BID | bridge identification information |
| R(B1), R(B2), R(B3) | routing information |
| IF | interface |

BEST MODE FOR CARRYING OUT THE INVENTION

Best modes for carrying out the present invention will be described with reference to FIGS. 1 to 6. The following embodiments relate to the case of applying the present invention to a bridge as a relay device for transmitting/receiving information via a bus conformed with the IEEE1394 standard and a bus conformed with the LAN standard which are connected to each other.

FIG. 1 is a block diagram showing a whole network in the embodiment. FIGS. 2A to 2D are diagrams showing a schematic configuration of a bridge of the embodiment. FIGS. 3 and 4 are flowcharts showing operations related to the embodiment executed in the bridge. FIGS. 5A and 5B are diagrams each showing the structure of a packet transmitted in conformity with the IEEE1394 standard in a network in the embodiment. FIG. 6 is a diagram showing the structure of a frame transmitted in conformity with the LAN standard in a network in the embodiment.

(I) Configuration of Entire Network

First, the configuration of an entire network and a bridge in the embodiment will be described with reference to FIG. 1 and FIGS. 2A to 2D.

As shown in FIG. 1, a network NT of the embodiment includes: a display device D having a display capable of displaying an image corresponding to image information transmitted via a bus BS1, a speaker for generating sound corresponding to sound information transmitted together with the image information via the bus BS1, and an interface IF as receiving means connected to the bus BS1 and performing necessary input/output process; a bridge B1 connecting the bus BS1 and a bus BS2 and relaying the image information and the like; a bridge B2 connecting the bus BS2 and a bus BS3 and relaying the image information and the like; a bridge B3 connecting the bus BS3 and a bus BS4 and relaying the image information and the like; and a hard disk drive H having an interface IF as receiving means connected to the bus BS4 and performing necessary input/output process, connected to the bus BS4, and transmitting the recorded image information and the like via the bus BS4.

In the configuration, the buses BS1, BS3, and BS4 are buses conformed with the IEEE1394 standard and through which information is transmitted, and the bus BS2 is a bus conformed with the LAN standard and through which information is transmitted.

Next, the configuration and operation of each of the bridges B1 to B3 will be described with reference to FIGS. 2A to 2D to FIG. 4. Since the configurations and operations of the bridges B1 to B3 of the embodiment are basically the same, the configuration and operation of the bridge B1 as a representative will be described below.

As shown in FIG. 2A, the bridge B1 of the embodiment has a routing information processor 1, a routing information storage 2 as first storing means, a device information processor 3, a device information storage 4 as second storing means, a message generator 5 as generating means and command generating means, a message analyzer 6 as extracting means, a format converter 10, a first packet transmitter/receiver 7 as transmitting means and command transmitting means, a second packet transmitter/receiver 8 as transmitting means and command transmitting means, an operation unit 11 as instructing means constructed by a remote controller of a wireless communication method, an operation button, or the like, and a display unit 12 constructed by a liquid crystal display that displays an operation state of the bridge B itself. The routing information processor 1, the routing information storage 2, the device information processor 3 as allocating means, the device information storage 4, the message generator 5, the message analyzer 6, the format converter 10, the first packet transmitter/receiver 7, the second packet transmitter/receiver 8, the operation unit 11, and the display unit 12 are connected so as to be able to transmit/receive information to one another via an internal bus 9.

The general operation of the bridge B1 will now be described.

First, routing information recorded in the routing information storage 2 will be described. The routing information is a list of bridge identification information of another bridge to which information can be transferred when viewed from each of the buses BS1 and BS2 directly connected to the bridge B1.

Figure 2B:
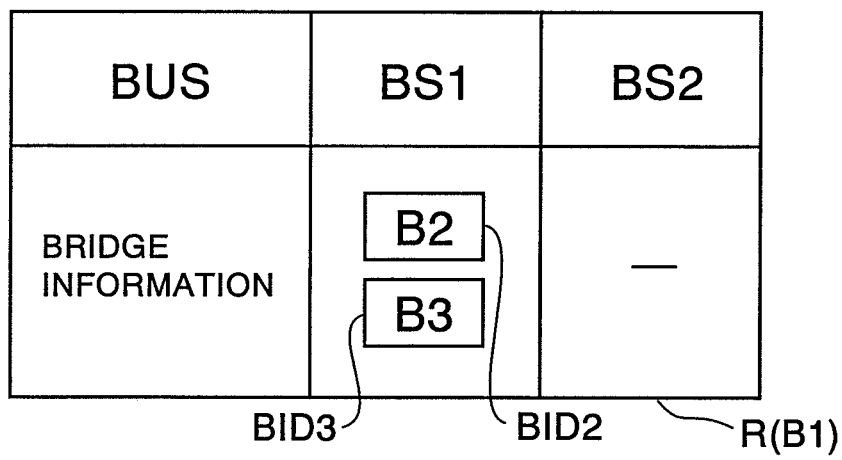

Specifically, as shown in FIG. 2B, routing information R(B1) stored in the routing information storage 2 in the bridge B1 includes, as a part related to the bus BS1 directly connected to the bridge B1, a list of bridge identification information BID2 indicative of another bridge B2 connected to the bus BS2 side as another bus directly connected to the bridge B1 other than the bus BS1 seen from the bus BS1, and the bridge identification information BID3 indicative of further another bridge B3 connected via the another bridge B2. Similarly, the routing information R(B1) includes, as a part related to the bus BS2 directly connected to the bridge B1, a list of bridge identification information indicative of another bridge connected to the bus BS1 side as another bus directly connected to the bridge B1 other than the bus BS2 seen from the bus BS2 (in the case shown in FIG. 1, the another bridge does not exist, so that no information is included as the part related to the bus BS2 in the routing information R(B1)).

Figure 2C:
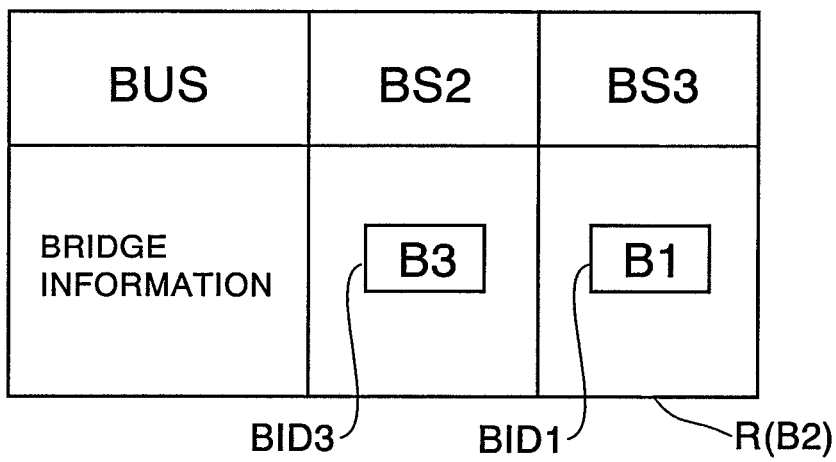

As shown in FIG. 2C, routing information R(B2) stored in the routing information storage 2 in the bridge B2 includes, as a part related to the bus BS2 directly connected to the bridge B2, bridge identification information BID3 indicative of another bridge B3 connected to the bus BS3 side as another bus directly connected to the bridge B2 other than the bus BS2 seen from the bus BS2. Similarly, the routing information R(B2) includes, as a part related to the bus BS3 directly connected to the bridge B2, bridge identification information BID1 indicative of another bridge B1 connected to the bus BS2 side as another bus directly connected to the bridge B2 other than the bus BS3 seen from the bus BS3.

Figure 2D:
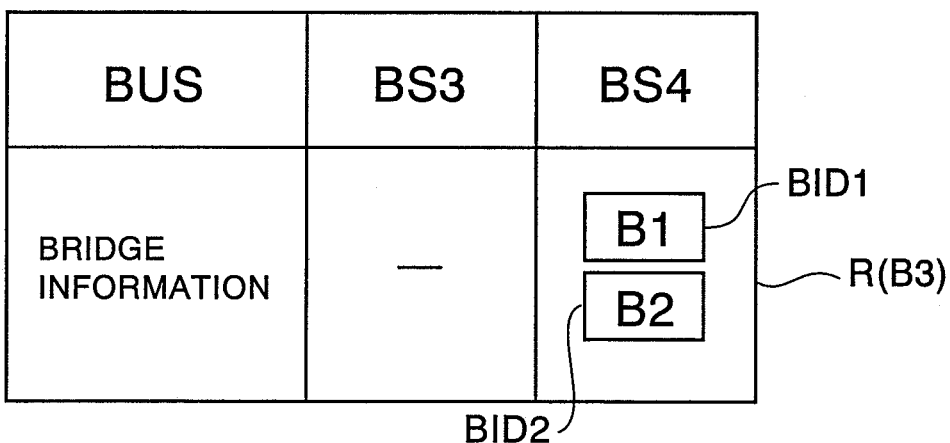

Further, as shown in FIG. 2D, routing information R(B3) stored in the routing information storage 2 in the bridge B3 includes, as a part related to the bus BS4 directly connected to the bridge B3, a list of bridge identification information BID2 indicative of another bridge B2 connected to the bus BS3 side as another bus directly connected to the bridge B3 other than the bus BS4 seen from the bus BS4, and the bridge identification information BID1 indicative of further another bridge B1 connected via the another bridge B2. Similarly, the routing information R(B3) includes, as a part related to the bus BS3 directly connected to the bridge B3, a list of bridge identification information indicative of another bridge connected to the bus BS4 side as another bus directly connected to the bridge B3 other than the bus BS3 seen from the bus BS3 (in the case shown in FIG. 1, the another bridge does not exist, so that no information is included as the part related to the bus BS3 in the routing information R(B3)).

The routing information processor 1 detects a change in the connection state of the bridge B in the network NT while transmitting/receiving a routing information signal Sr to/from the routing information storage 2 and, as necessary, updates the routing information R(B1).

The bridge identification information BID in the embodiment will be described generally with reference to FIG. 3A.

Figure 3A:
[FIGS. 3A to 3C]
Figure 4:
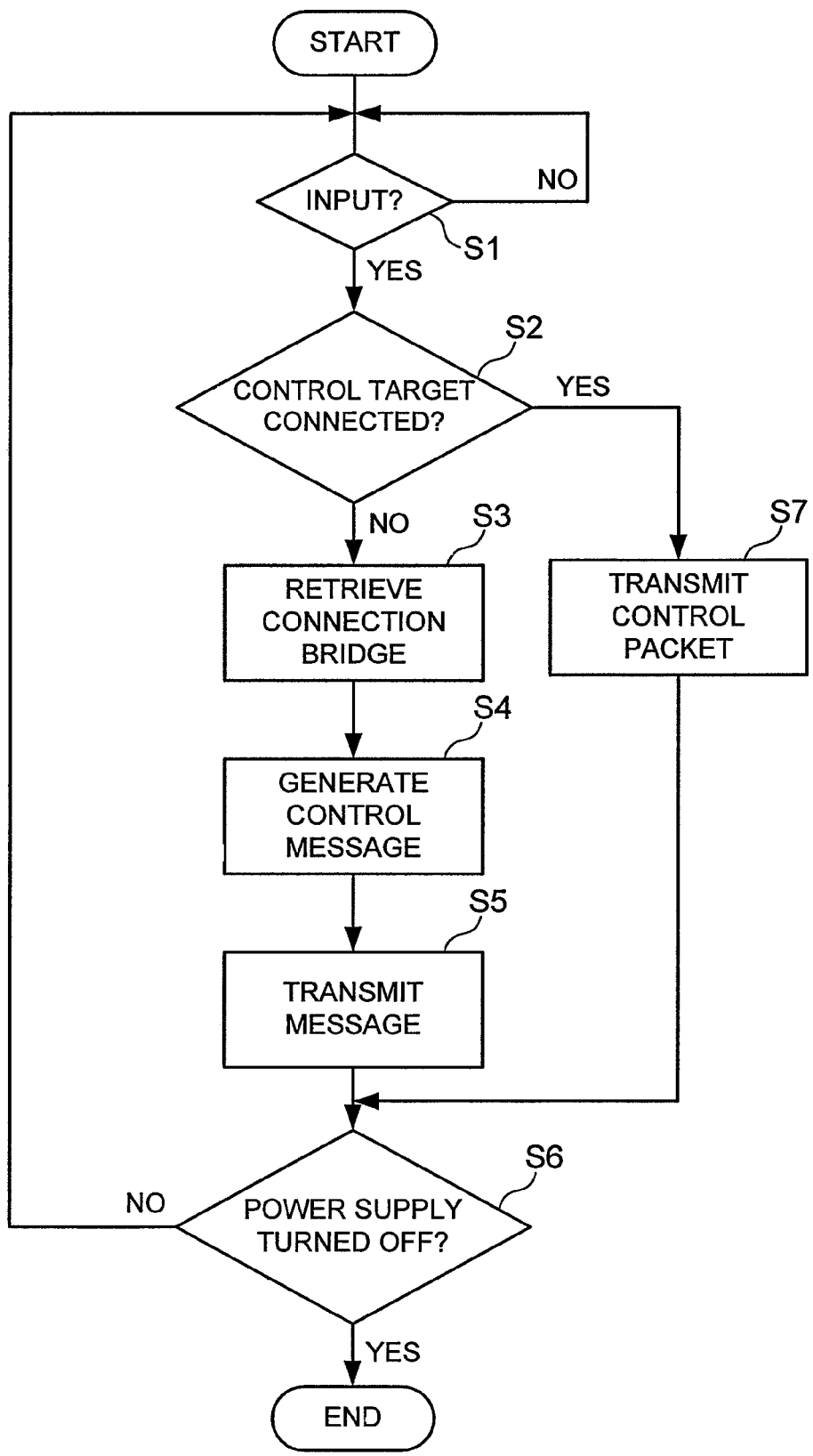
[FIG. 4]

As shown in FIG. 3A, the bridge identification information BID is constructed by combining, on the basis of any one of interfaces for bus connection (corresponding to packet transmitters/receivers in FIG. 2A) of the bridge B to which the bridge identification information BID corresponds, the bus kind information 20 is identifying the kind of the bus BS to which the interface corresponds and unconditional device identification information which is preset for each of the buses BS (unique device identification information for identifying a relay device on the bus BS and is, for example, a 64-bit value). Only one piece of bridge identification information BID corresponds to one bridge B.

More concretely, first, as the bus kind information 20, when the bus BS is conformed with the IEEE1394 standard, the value is set to, for example, "1". When the bus BS is conformed with the IP standard, the value is set to, for example, "2". As the device identification information 21, when the bus BS is conformed with the IEEE1394 standard, EUI (extended unique identifier)-64 (64 bits) determined in the standard is used as it is. When the bus BS is conformed with the IP standard, the MAC (Media Access Control) address (48 bits) determined in the standard is used as it is. When the information is made of less than 64 bits, the part short for 64 bits is stuffed with data "0" to make the information of 68 bits. In the example, the bridge identification information BID corresponding to the bridge B having an interface conformed with the IEEE1394 standard having a value of EUI-64 of, for example, "0x0123456789abcdef" is "0x10123456789abcdef".

Each of the bridges B in the embodiment has two interfaces. Bridge identification information corresponding to one arbitrarily determined interface is used as the bridge identification information BID of the bridge B and, at the start of operation of the bridge B, the value is stored as the bridge identification information BID of the bridge B itself into the routing information processor 1.

Figure 3B:
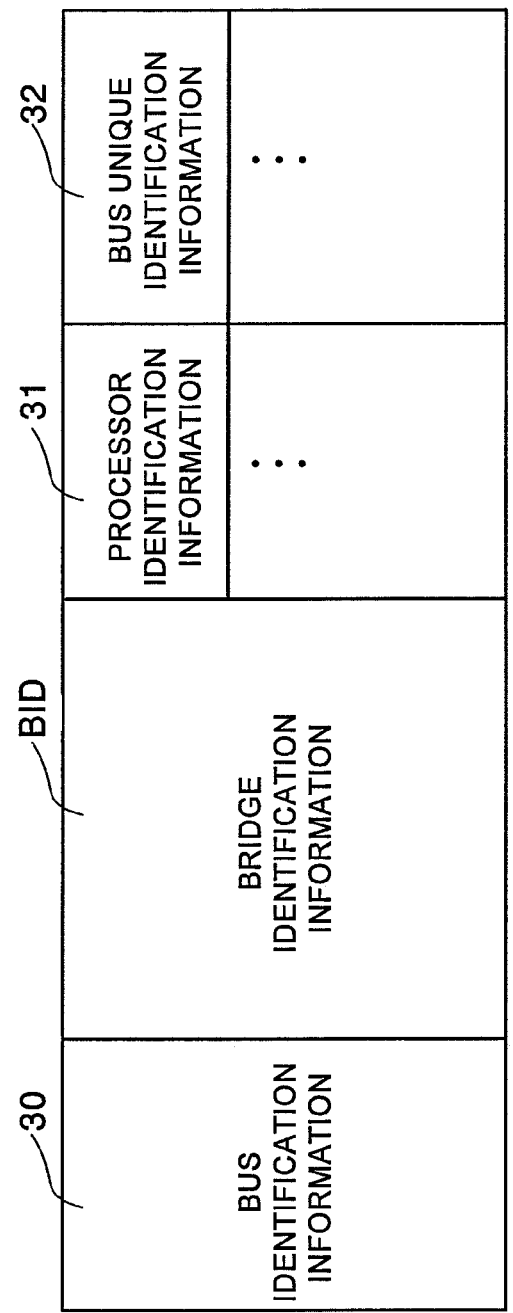

The device information recorded on the device information storage 4 will be described. As the device information, as shown in FIG. 3B, processor identification information 31 is stored together with bus identification information 32 as a pair with bus identification information 30 indicative of a bus to which the another information processor is connected and the bridge identification information BID. The processor identification information 31 is information for identifying each of the other information processors (in the embodiment, the display device D and the hard disk drive H) which can be recognized from the bridge B1. The bus identification information 32 is information for identifying each of the other information processors on the bus BS to which another information processor is connected.

In the case where a plurality of other information processors are connected to one bus BS, as shown in FIG. 3B, pairs of the processor identification information 31 and the bus unique identification information 32 only by the number of other information processors are associated with one piece of the bus identification information 30 and the bridge identification information BID.

Specifically, in the case shown in FIG. 1 and FIGS. 2A to 2D, in the device information storage 4 in the bridge B1, the processor identification information 31 and the bus unique identification information 32 each indicative of the hard disk drive H is stored so as to be paired with the bus identification information 30 indicative of the bus BS4 to which the hard disk drive H is connected and bridge identification information BID3 indicative of the bridge B3 to which the bus BS4 is directly connected. Further, the processor identification information 31 and the bus unique identification information 32 each indicative of the display device D is stored so as to be paired with the bus identification information 30 indicative of the bus BS1 to which the display device D is connected and bridge identification information BID1 indicative of the bridge B1 itself to which the bus BS1 is directly connected.

Concretely, in the case where the bus BS to which the information processor is connected is conformed with the IEEE1394 standard, the value of EUI-64 is used as the bus unique identification information 32. In the case where the bus is conformed with the IP standard, a UUID (Universally Unique IDentifier (another name: GUID (Global Unique IDentifier)) generally used to identify an UPnP (Universal Plug and Play) device is used. For example, in the case where an information processor conformed with the IEEE1394 standard having the EUI-64 value "0x0123456789abcdef" is connected and the processor identification information 31 having the value "0x01" is assigned to the information processor, a pair of the processor identification information 31 and the bus unique identification information 32 having the value "0x0123456789abcdef" is stored together with the corresponding bus identification information 30 and the bridge identification information BID into the device information storage 4.

The processor identification information 31 and the bus unique identification information 32 indicative of the hard disk drive H and the processor identification information 31 and the bus unique identification information 32 indicative of the display device D is stored in each of the device information storage 4 in the bridge B2 and the device information storage 4 in the bridge B3 like in the device information storage 4 in the bridge B1.

While transmitting/receiving device identification information signal Sn to/from the device information storage 4, when the connection state of the information processor in the network NT changes, the device information processor 3 detects the change and updates the corresponding processor identification information 31 as necessary. More concretely, when the connection state of the information processor in the network NT changes, the device information processor 3 newly assigns the unique processor identification information 31 in the bus BS to which the information processor in which the change occurred to each of the information processor and updates the information in the device information storage 4 with the assigned processor identification information 31.

After that, the information indicative of designation of an information processor (in the embodiment, the hard disk drive H or the display device D) to be subjected to operation control using the bridge B1, the operation to be controlled in the designated information processor, and the like is input in the operation unit 11 by the operator using the operation unit 11. From the operation unit 11, an operation signal Sop corresponding to the input operation is output to the message generator 5 via the internal bus 9.

In the case of controlling, for example, the operation of the hard disk drive H from the bridge B1 on the basis of the operation signal Sop, the message generator 5 generates a control message used for the operation (including the information that the target of the operation control is the hard disk drive H, and the concrete operation to be controlled), and transmits the control message as a message signal Smg to the internal bus 9.

The control message in the embodiment will be described generally with reference to FIG. 3C.

Figure 3C:
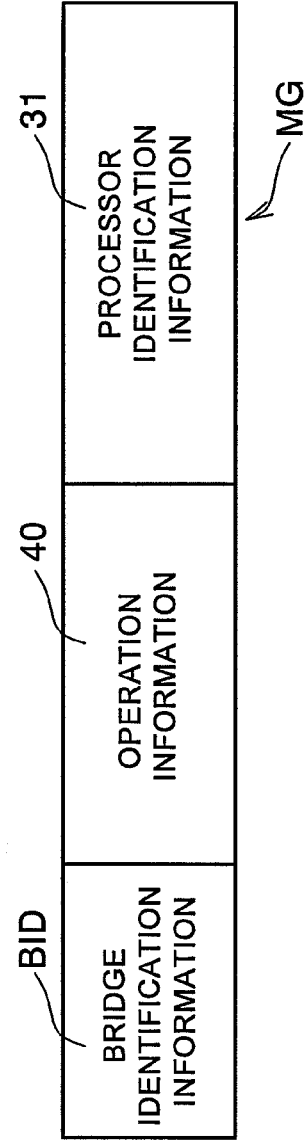

As shown in FIG. 3C, the control message MG has, at its head, the bridge identification information BID (68 bits) indicative of the bridge B as a destination to which the bus BS is connected. To the bus BS, the information processor whose operation is controlled on the basis of the control message MG is connected is connected. The control message MG includes: operation information 40 (made of, for example, eight bits) indicative of an operation to be executed by the information processor and the processor identification information 31 indicative of the information processor itself to be controlled. Operations indicated by the operation information 40 include "turn-on/off of the power supply", "playback", "stop", "connection preparation", and the like in accordance with the functions of the information processor to be controlled. For example, as the control message MG for making a player (it is assumed that the value of the processor identification information 31 is "0x01") connected to the bridge B having the bridge identification information BID "0x10123456789abcdef" perform a "playback" operation, the part of the bridge identification information BID is "0x10123456789abcdef", the part of the operation information 40 is "playback (0x01)", and the part of the processor identification information 31 is "0x01".

When the format converter 10 changes the format used at the time of transferring the control message MG included in the message signal Smg in accordance with the information transmission standard in any of buses through which the control message MG passes to reach the bridge B as a destination (for example, when the object to be controlled is the hard disk drive H, the bridge B3) as described in detail later, and outputs the resultant signal as a packet signal Spt to the first packet transmitter/receiver 7 or the second packet transmitter/receiver 8. In the case where the control message MG is to be transmitted to the bus BS2, the format used at the time of transferring the control message MG to a format according to the LAN standard, and the resultant is output as the packet signal Spt to the first packet transmitter/receiver 7. On the other hand, when the control message MG is to be transmitted to the bus BS1, the format at the time of transferring the control message MG to the format according to the IEEE1394 standard, and the resultant is output as the packet signal Spt to the second packet transmitter/receiver 8.

When the control message MG included in the packet signal Spt is to be transmitted to the bus BS2, the first packet transmitter/receiver 7 connected to the bus BS2 conformed with the LAN standard transmits the format-converted packet signal Spt to the bus BS2.

When the control message MG included in the packet signal Spt is to be transmitted to the bus BS1, the second packet transmitter/receiver 8 connected to the bus BS1 conformed with the IEEE1394 standard transmits the format-converted packet signal Spt to the bus BS1.

On the other hand, when the packet signal Spt including the control message MG is received from the bus BS2 or BS1 via the first packet transmitter/receiver 7 or the second packet transmitter/receiver 8, the control message MG included in the packet signal Spt is analyzed in the message analyzer 6. According to the analysis result, whether the control message MG is to be transferred as it is to another bridge B or not or whether a predetermined operation such as transfer of a predetermined command to the bus BS1 or BS2 directly connected to the bridge B1 is to be executed or not is determined. According to the determination result, the control message MG is transferred to another bridge B or the bus BS1 or BS2. In the case where format conversion is necessary at the time of the transfer, the control message is once output to the format converter 10 and subject to necessary format conversion. After that, the control message is included in the packet signal Spt and transferred to a requesting destination.

The operation state of the bridge B1 in the series of operations is displayed on the display unit 12 on the basis of an operation state signal Sdp output from any of the components via the internal bus 9.

(II) Embodiment of Control Operation

Next, the control operation of the hard disk drive H or the display device D in the embodiment, executed in each of the bridges B having the above-described configuration and operation will be concretely described with reference to FIGS. 4 and 5.

First, with reference to FIG. 4, the operation of the bridge B in the case where an operation of controlling the operation of the hard disk drive H or the display device D in any of the bridges B in a remote place will be described.

In the case of executing the remote operation control, as shown in FIG. 4, the bridge B always monitors whether an operation of performing the operation control is executed in the operation unit 11 or not (step S1, S1; NO). When the operation is executed (step S1; YES), a check is made to see whether or not an information processor to be controlled in the executed operation is connected to the bus BS itself on which the operation is executed with reference to device information stored in the device information storage 4 in each of the bridges B (step S2).

In the case where the information processor to be controlled is connected to the bus BS which is directly connected to the bridge B itself on which the operation is executed (step S2; YES), the message generator 5 generates and transmits a control command corresponding to the operation executed in step S1 (that is, the control command for controlling the operation of the information processor connected to the bus BS directly connected to the bridge B itself) corresponding to the operation executed in step S1 to the information processor to be controlled (step S7). The program shifts to operation in step S6 which will be described later.

On the other hand, when it is determined in step S2 that the information processor to be controlled is not connected to the bus BS directly connected to the bridge B itself on which the operation is executed (step S2; NO), another bridge B to which the bus BS to which the information processor to be controlled is connected is connected is retrieved by referring to the routing information n the routing information storage 2 and the device information in the device information storage 4. Further, a check is made to see whether or not another bridge B to which the information processor to be controlled is directly connected via the bus BS can be transferred from any of the buses BS to which the bridge B itself is directly connected (in the following description, the transferable bus will be called a bus A) (step S3).

A concrete process in the step S3 is as follows. For example, in the case of controlling the operation of the hard disk drive H connected to the end of the bus BS4 directly connected to the bridge B3 by using the bridge B1 shown in FIG. 1, as the process in the step S3, the bridge B3 to which the hard disk drive H to be controlled is directly connected is retrieved. Since the control message can be transferred to the bridge B3 using the bridge B1 as a center from the bus BS1 side, in this case, the bus BS1 corresponds to the "bus A" in the step S3.

When the bus A is defined, the concrete control message MG for controlling the information processor to be controlled is generated in the message generator 5 (step S4). The control message MG includes, in the mode shown in FIG. 3C, the processor identification information 31 for identifying the information processor to be controlled and the operation information 40 indicative of the concrete operation to be controlled.

After that, the generated control message MG is transmitted from the bus BS (the bus BS2 in the example) other than the bus A recognized in the step S3 (the bus BS1 in the case of the example in which the operation of the hard disk drive H is controlled by the bridge B1) to all of the other bridges connected to the bus BS2 (only the bridge B2 in the case of the example) (step S5).

After that, the transmitted control message MG is sequentially transferred finally to the bridge B to which the information processor to be controlled is directly connected by the transferring operation which will be described later shown in FIG. 5. By the operations in the steps S1, S2, and S7 in the bridge B as the transfer destination, the control message is transmitted to the information processor to be controlled, and the operation of the information processor is actually controlled.

After transmission of the control message MG, whether the power supply of the bridge B is turned off or not is determined (S6). When the power supply is not turned off (step S6; NO), the program returns to the step S1 and monitors that a new operation is executed in the operation unit 11. On the other hand, when the power supply is turned off (step S6; YES), the process in the embodiment is finished.

Next, the processes performed in the case where a bridge B receives the control message MG transmitted from another bridge B will be described with reference to FIG. 5.

Each of the bridges B always monitors whether the control message MG generated by another bridge B is transmitted or not (step S10, S10; NO). When the control message MG is transmitted (step S10; YES), the control message MG transmitted is examined to see whether the destination of the control message MG (the bridge identification information BID included-in the control message MG) is the received bridge B itself or not (step S11). When the destination is the bridge B itself (step S11; YES), the control command corresponding to the control message MG is transmitted to the information processor as an object to be controlled of the control message MG, the information processor is allowed to actually perform an operation corresponding to the control command (step S16), and the program advances to the step S15.

As the concrete process in the step S16, first, the operation information 40 and the processor identification information 31 (refer to FIG. 3C) is extracted from the transferred control message MG. A control command for making the information processor indicated by the extracted processor identification information 31 execute the operation indicated by the operation information 40 is generated and transmitted to the information processor.

On the other hand, in the case where it is determined in step S11 that the destination is not the bridge B itself, in other words, the destination is another bridge B (step S11; NO), the bridge B as the destination is retrieved from a list corresponding to the bus BS through which the control message MG is transmitted in the routing information R in the routing information storage 4 (step S12). When none of the bridges B cannot be found as a retrieval result (step S12; NO), the control message MG cannot be transferred to the bridge B indicated as the destination. Consequently, the control message MG is discarded and the program advances to step S15 which will be described later.

On the other hand, when it is determined in the step S13 that another bridge B as a destination can be found (step S13; YES), the received control message MG is transferred to all of the bridges B connected to the buses BS other than the bus BS to which the control message MG is transmitted (step S14).

The processes in the steps S12 to S14 are concretely as follows. For example, in the case of controlling the operation of the hard disk drive H connected to the end of the bus BS4 directly connected to the bridge B3 by using the bridge B1 shown in FIG. 1, in the processes in the steps S12 to S14 executed by the bridge B2 existing between the bridges B1 and B3, the bridge B3 can be retrieved as the bridge B to which the hard disk drive H to be controlled is directly connected (see the steps S12 and S13; YES), the operation (step S14) of transferring the received control message MG to the bridge B3 connected to the bus BS3 as another bus other than the bus BS2 to which the control message MG is transmitted is executed.

After transfer of the control message MG, whether the power supply of the bridge B is turned off or not is determined (step S15). When the power supply is not turned off (step S15; NO), the program returns to the step S10 and whether a new control message MG is received or not is monitored. On the other hand, when the power supply is turned off (step S15; YES), the process in the embodiment is finished.

As a concrete example of a series of operations described with reference to each of FIGS. 4 and 5, for example, operations in the case where an operation of turning on the power supply of the hard disk drive H connected to the bridge B3 is performed by the user using the operation unit 11 of the bridge B1 will be described.

When the operation of turning on the power supply of the hard disk drive H is executed in the bridge B1, a check is made to see whether the hard disk drive H to be controlled in the bridge B1 is connected to the bus BS1 or BS2 directly connected to the bridge B1 (step S2 in FIG. 4). Since the hard disk drive H is no connected to any buses BS directly connected to the bridge B1 (NO in step S2 in FIG. 4), the bridge B3 is retrieved from routing information stored in the routing information storage 4 in the bridge B1 (step S3 in FIG. 4). In the example of FIG. 1, the bridge B3 in the list corresponding to the bus BS1 in the routing information is retrieved (see FIG. 2B and YES in step S3 in FIG. 4). Therefore, the control message MG indicating that the power supply of the hard disk drive H is turned on is generated with the bridge B3 as a destination in the message generator 5 (step S4 in FIG. 4). The control message MG is transmitted to the bridge B2 connected to a bus BS other than the bus BS1 connected to the bridge B1, that is, the bus BS2 side (step S5 in FIG. 4).

Figure 5:
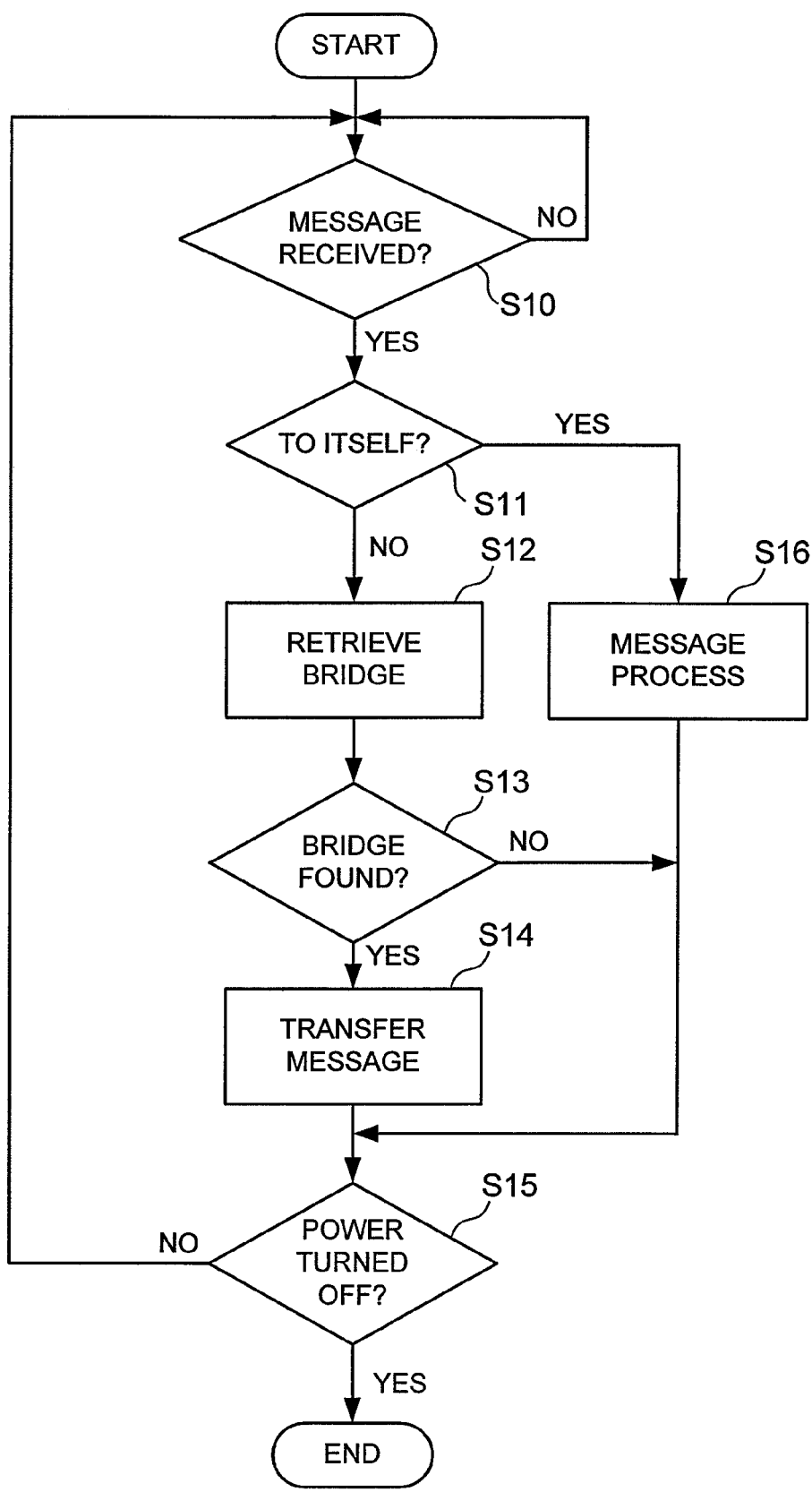
[FIG. 5]

The bridge B2 which has received the control message MG (YES in step S10 in FIG. 5) determines whether the destination included in the control message MG is the bridge B2 or not (step S11 in FIG. 5). In this case, the destination is not the bridge B2 (NO in step S11 in FIG. 5), the bridge B3 as the destination is newly retrieved from the routing information stored in the routing information storage 4 in the bridge B2 (steps S12 and S13 in FIG. 5). As a result of the retrieval, the bridge B3 is retrieved from the routing information (YES in step S13 in FIG. 5), so that the control message MG is transferred to the bridge B3 connected to the bus BS3 side. At this time, the control message MG transmitted via the bus BS2 conformed with the LAN standard is going to be sent to the bus BS3 conformed with the IEEE1394 standard. Consequently, the format converter 10 executes a process of converting the format at the time of transferring the control message MG from a format conformed with the LAN standard to a format conformed with the IEEE1394 standard.

The bridge B3 receives the control message from the bridge B2 (YES in step S10 in FIG. 4) and checks to see whether the destination of the control message is the bridge B3 or not (step S11 in FIG. 4). Since the destination of the control message is the bridge B3 itself in this case (YES in step S11 in FIG. 4), the control message MG is analyzed by the message analyzer 6 in the bridge B3 and transmits a control command to turn on the power supply of the hard disk drive H to the hard disk drive H via the bus BS4 (step S16 in FIG. 5).

In the foregoing embodiment, depending on an operation of the user, there may be a case that a plurality of control messages MG are required and a case where a plurality of information processors to be controlled exist. In such cases, according to each operation, a process of transmitting a plurality of control messages MG or a process of transferring the control message MG to another bridge B has to be performed concurrently.

(III) Embodiment of Format Converting Process

A concrete process of format conversion between a packet conformed with the IEEE1394 standard and a frame conformed with the LAN standard, executed mainly in the format converter 10 will be described with reference to FIGS. 6A and 6B and FIG. 7.

Before explaining the concrete process, the format of a packet conformed with the IEEE1394 standard and the format of a frame conformed with the LAN standard will be described.

First, the format of a packet conformed with the IEEE1394 standard will be described with reference to FIGS. 6A and 6B.

Figure 6A:
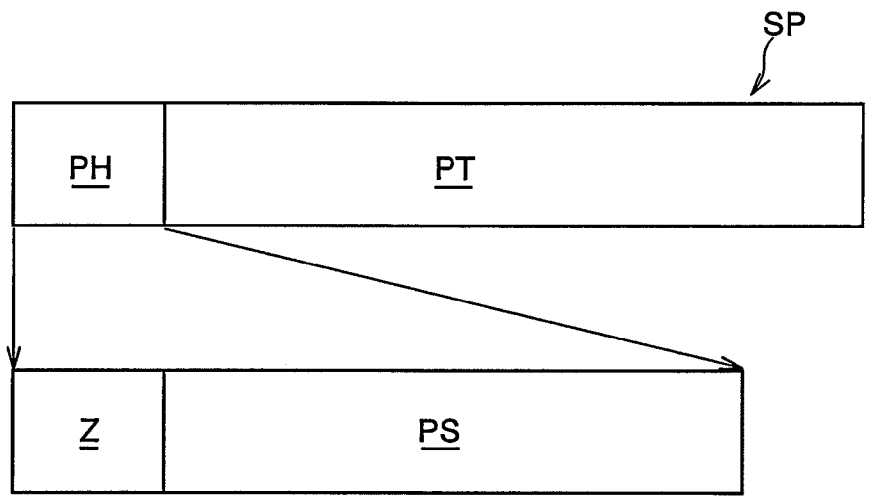
[FIGS. 6A to 6B]

Generally, in the case of transmitting image information or sound information (for example, image information or sound information compressed by the MPEG (Moving Picture Expert Group) standard) by using a bus BS conformed with the IEEE1394 standard, as shown in FIG. 6A, a packet header PH of four bytes is added to one packet PT (having an information amount of, for example, 188 bytes) in the image information or sound information, thereby constructing a source packet SP of total 192 bytes. The packet header PH is constructed by zero data Z and a time stamp PS. The time stamp PS is information indicative of time to start decoding of the source packet SP in an apparatus which receives the source packet SP.

The source packet SP is divided every preset information amount into data blocks. Further, by a predetermined number of data blocks or a plurality of source packets SP, a so-called isochronous packet conformed with the IEEE1394 standard is constructed.

Figure 6B:
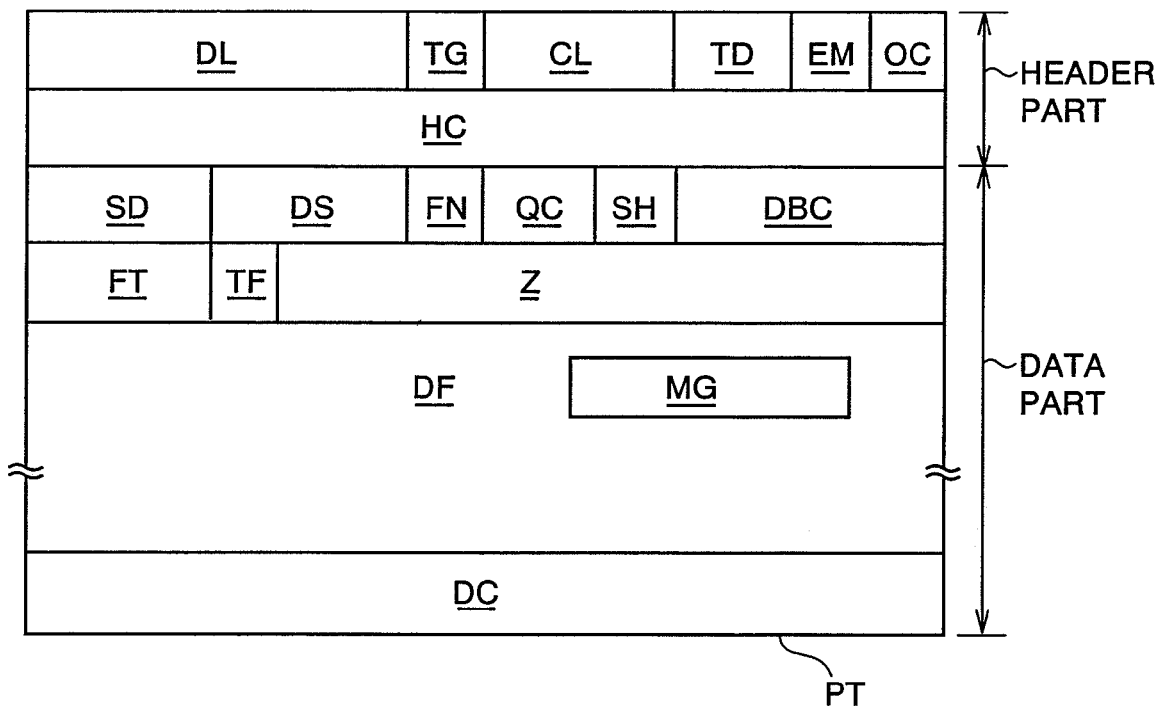

For example, as shown in FIG. 6B, the isochronous packet PT is constructed by data length information DL indicative of a total information amount of data belonging to the "data part" shown in FIG. 6B, tag information TG indicative of the attribute or the like of a format in the IEEE1394 standard, channel information CL indicative of a channel through which the isochronous packet PT is transmitted on the bus BS conformed with the IEEE1394 standard, attribute information TD indicative of the attribute of a packet, copyright information EM and OC as information on the copyright of data included in the isochronous packet PT, an error correction code HC of the "header part" shown in FIG. 6B, processor identification information SD for identifying an information processor which has sent the isochronous packet PT, data block size information DS indicative of an information amount of one data block, division number information FN indicative of the number of data blocks constructing the source packet SP (in other words, the dividing number of the source packet SP), padding number information QC having no meaning as packet data but indicative of the number of pieces of padding data for adjusting an information amount of the entire isochronous packet PT, header presence/absence information SH indicative of the presence/absence of the packet header PH in the source packet SP, data block number information DBC indicative of the number of data blocks included in the isochronous packet PT, format attribute information FT indicative of the attribute of the format, time shift data information TF indicative of whether the data is so-called time shift data or not, zero data Z, a data field DF in which the data block is actually stored, and an error correction code DC for the entire data part.

In the case of transmitting the control message MG by using the isochronous packet PT, the control message MG is stored in the data field DF as shown in FIG. 6B.

In the embodiment, the control message MG is transmitted by using the isochronous packet PT. In view of the fact that control data is usually transmitted by using a so-called asynchronous packet such as write transaction and is standardized in the IEEE1394 standard, it is also possible to store the control data MG in a so-called data field (data_field) in the asynchronous packet and transmit the packet.

The format of a frame conformed with the LAN standard will be described with reference to FIG. 7.

Figure 7:
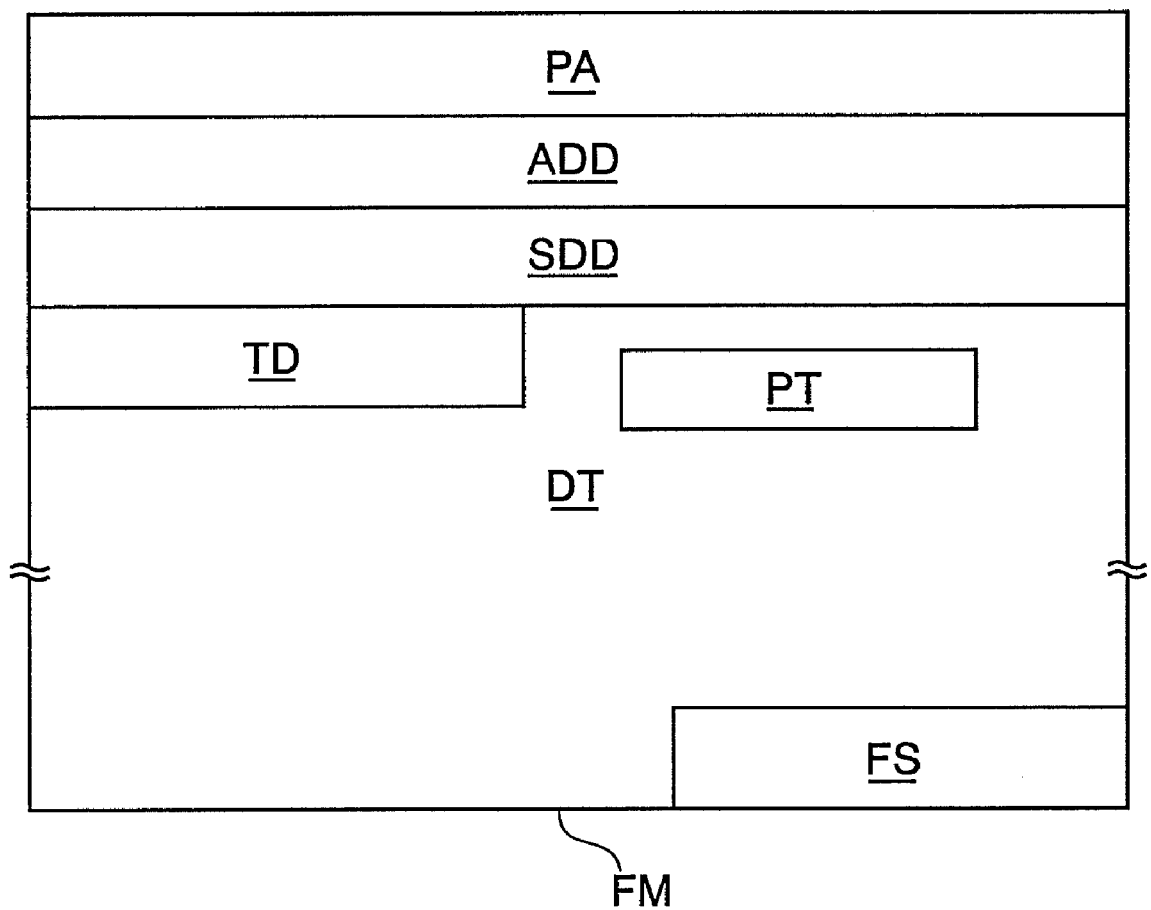
[FIG. 7]

As shown in FIG. 7, a frame FM conformed with the LAN standard is constructed by start data PA showing the start of the frame FM conformed with the LAN standard, destination information ADD indicative of the destination in a network of the frame FM, processor identification information SDD for identifying an information processor which has transmitted the frame FM, attribute information TP indicative of the attribute of data included in a data part DT which will described later, the data part DT in which data itself to be transmitted as the frame FM is stored, and an error correction code FS for the entire frame FM.

In the format converter 10, format conversion between the isochronous packet PT and the frame FM shown in FIGS. 6A and 6B and FIG. 7 is performed.

Specifically, for example, in the bridge B1 shown in FIG. 1, in the case of format-converting the isochronous packet PT (including the control message MG) received from the bus BS1 conformed with the IEEE1394 standard to the frame FM for the bus BS2, the entire isochroous packet PT received is stored in the data part DT in the frame FM, and the resultant packet is transmitted to the bus BS2. By setting the value of the format attribute information FT in the original isochronous packet PT to a value which is not used in the other transmission on buses of the LAN standard, the receiver of the frame FM can be recognized that the frame FM is a frame FM including the original isochronous packet PT.

The format converter 10 in the bridge B2 which has received the frame FM including the isochronous packet PT from the bus BS2 conformed with the LAN standard extracts the original isochronous packet PT from the received frame FM and transmits it to the bus BS3 conformed with the IEEE1394 standard. At this time, the format converter 10 performs the following four processes to form a new packet PT.

(A) A process of converting the value of the time stamp PS included in the extracted isochronous packet PT to a new value using, as a reference, time when the frame FM including the isochronous packet PT is received from the bus BS2.

(B) A process of converting the value of the channel information CL included in the extracted isochronous packet PT to a value indicative of an unused channel in the bus BS3 through which the packet is to be transmitted.

(C) A process of re-generating the error correction code HC included in the extracted isochronous packet PT by using the values obtained by the converting processes (A) and (B).

(D) A process of converting the value of the processor identification information SD included in the extracted isochronous packet PT to the value indicative of the bridge B2 itself.

By transmitting a new packet PT (including the control message MG) obtained by performing the processes (A) to (D) to the bus BS3, the new packet PT conformed with the IEEE1394 standard can be transmitted also on the bus BS.

In the foregoing embodiment, for example, an operation of transmitting image information or the like recorded on the hard disk drive H and displaying a corresponding image on the display device D can be executed, for example, in the bridge B1 by one-dimensionally controlling the operations of the hard disk drive H and the display device D.

As described above, with the operations of the bridge B of the embodiment, in the bridge B that connects a plurality of buses BS whose standards applied at the time of transmitting information are different from each other, the control message MG corresponding to an instructed operation is generated and transmitted to the information processor in which the operation is to be performed via the bus BS to which the information processor is connected. Consequently, the operations of information processors connected on the buses BS whose standards are different from each other can be controlled one-dimensionally by the bridge B.

Therefore, by one-dimensionally controlling transmission/reception or the like of information among the information processors connected on the buses BS conformed with different information transmission standards, the transmission/reception or the like can be performed easily.

With respect to the hard disk drive H and the display device D connected on buses whose information transmission standards are different from each other, output of image information or the like recorded on the hard disk drive H to the display device D can be one-dimensionally controlled and efficiently executed in the bridge B.

Further, the operations in the information processors such as the hard disk drive H, the display device D, and the like connected to the ends of buses BS can be one-dimensionally controlled in the bridge B.

Further, the operation of the display device D connected to a serial bus BS1 through which the packet PT of image information or the like is transmitted and the operation of the hard disk drive H connected via the bus BS3 through which image information or the like formed in the frame FM is transmitted in parallel can be one-dimensionally realized in the bridge B connecting the buses BS.

Since the format conversion between the bus BS1 conformed with the IEEE1394 standard and the bus BS2 conformed with the LAN standard is performed, image information or the like can be transmitted/received promptly between the two kinds of buses.

Since the control message MG to be transmitted to another bridge B includes the bridge identification information BID indicative of the bridge B connected to the bus BS to which the information processor to be controlled is connected, the operation information 40, and the processor identification information 31 indicative of the information processor whose operation to be controlled, a necessary control message MG can be transmitted/received without erroneously recognizing the destination and a target operation between the buses BS having the format converting process at the time of transmitting information.

Therefore, the operation of an information processor on another bus BS can be reliably controlled from a remote place.

The bridge identification information BID includes the pair of the bus kind information 20 and the processor identification information 21, and the pair of the bus unique identification information 32 and the corresponding processor identification information 31 is also included. Thus, the necessary control message MG can be reliably transmitted without erroneously recognizing the destination.

Further, in the bridge B which receives the control message MG, the processor identification information 31 and the operation information 40 is extracted from the control message MG, and a corresponding control command is generated and transmitted to the information processor whose operation is to be controlled. Consequently, the operation to be controlled can be reliably executed in the information processor to be controlled.

The present invention can be widely applied not only to buses conformed with the IEEE1394 standard and the LAN standard but also a network using a bus capable of connecting a personal computer and a peripheral device of the personal computer, an acoustic device and a video device, or the like and, further, a network conformed with an IP standard such as a so-called wireless LAN.

By recording programs corresponding to the flowcharts of FIGS. 4 and 5 in an information storing medium such as a flexible disk or a hard disk or obtaining the programs via the Internet or the like and recording them, and reading and executing the programs in a general computer, the computer can be utilized as the bridge B in the embodiment.

The invention claimed is:

1. A relay device for connecting a plurality of buses, wherein information communication standards which a plurality of the buses are to be in conformity to are different from each other, and a plurality of the buses need a converting process previously set at the time of transmitting information from one of the buses to another bus, the relay device comprising:

a first storing device which stores first identification information indicative of the relay device itself;

an allocating device which allocates different processor identification information to each of information processors connected to the buses;

a second storing device which stores second identification information including the allocated processor identification information and indicating the information processor, for each of the buses connected;

a generating device, at the time of controlling operation of a target information processor as the information processor connected to the another bus, which generates a control message including the first identification information indicative of the relay device connected to the another bus to which the target information processor is connected, operation information indicative of the operation, and the processor identification information indicative of the target information processor; and a transmitting device which transmits the generated control message to the relay device connected to the another bus to which the target information processor is connected.

2. The relay device according to claim 1, wherein the first identification information includes bus kind information indicative of a kind of each of the buses, and device identification information unique to the relay device in each of the buses.

3. The relay device according to claim 1, wherein the second identification information includes bus unique identification information which is preset for the information processor on the bus to which the information processor to which the processor identification information is allocated is connected, and the allocated processor identification information.

4. The another relay device to which the control message is transmitted from the relay device according to claim 1, comprising:

an extracting device which extracts the processor identification information and the operation information from the control message transmitted;

a command generating device which generates command information for making the information processor indicated by the extracted processor identification information execute the operation indicated by the extracted operation information; and a command transmitting device which transmits the generated command information to the information processor indicated by the extracted processor identification information.

5. The relay device according to claim 1, wherein the one of the buses is a bus conformed with the IEEE1394 standard, and the another bus is a bus conformed with the IP.

6. A relay method executed by a relay device connecting a plurality of buses, wherein information communication standards which a plurality of the buses are to be in conformity to are different from each other, and a plurality of the buses need a converting process previously set at the time of transmitting information from one of the buses to another bus, and the relay device comprising:

a first storing device which stores first identification information indicative of the relay device itself; an allocating device which allocates different processor identification information to each of information processors connected to the buses; and a second storing device which stores second identification information including the allocated processor identification information and indicating the information processor for each of the buses connected, the method comprising:

a generating process, at the time of controlling operation of a target information processor as the information processor connected to the another bus, of generating a control message including the first identification information indicative of the relay device connected to the another bus to which the target information processor is connected, operation information indicative of the operation, and the processor identification information indicative of the target information processor; and a transmitting process of transmitting the generated control message to the relay device connected to the another bus to which the target information processor is connected.

7. An information recording medium where a relay process program is computer-readably recorded, the relay process program making a relay computer included in a relay device for connecting a plurality of buses, wherein information communication standards which a plurality of the buses are to be in conformity to are different from each other, and a plurality of the buses need a converting process previously set at the time of transmitting information from one of the buses to another bus, function as:

a first storing device which stores first identification information indicative of the relay device itself;

an allocating device which allocates different processor identification information to each of information processors connected to the buses;

a second storing device which stores second identification information including the allocated processor identification information and indicating the information processor for each of the buses connected;

a generating device, at the time of controlling operation of a target information processor as the information processor connected to the another bus, which generates a control message including the first identification information indicative of the relay device connected to the another bus to which the target information processor is connected, operation information indicative of the operation, and the processor identification information indicative of the target information processor; and a transmitting device which transmits the generated control message to the relay device connected to the another bus to which the target information processor is connected.

* * * * *